Sept. 10, 1940.   B. E. WILLIAMS ET AL   2,214,153
METHOD OF TREATING CARCASSES
Filed Nov. 21, 1938
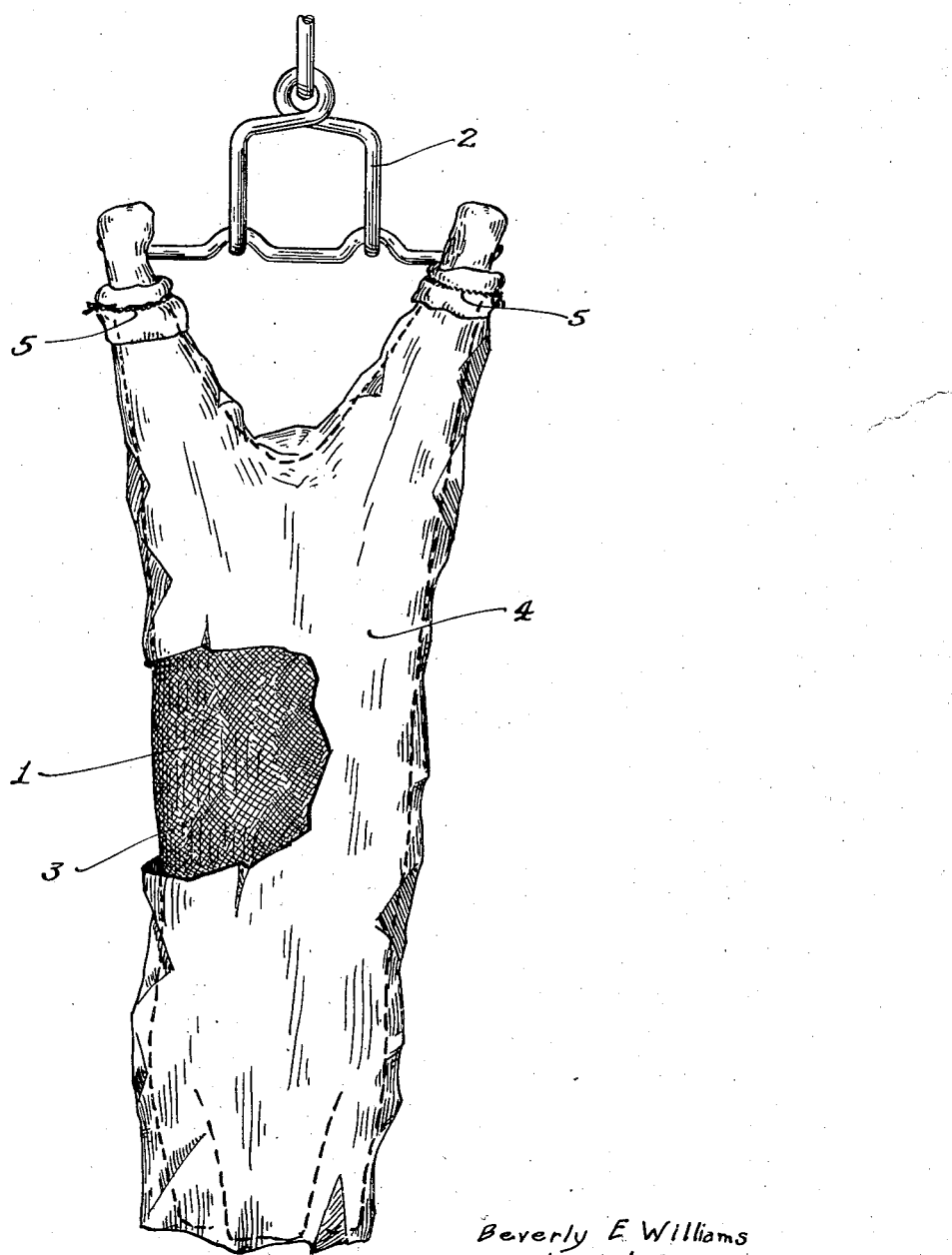
Beverly E Williams
and Leon L. Cadwell
Inventor
By Roy W Johns
Attorney Patented Sept. 10, 1940

2,214,153

UNITED STATES PATENT OFFICE 2,214,153

METHOD OF TREATING CARCASSES

Beverly E. Williams and Leon L. Cadwell, Chicago, Ill., assignors to Swift and Company, Chicago, Ill., a corporation of Illinois Application November 21, 1938, Serial No. 241,709

8 Claims. (Cl. 99—174)

This invention relates to the treatment of edible carcasses and wholesale cuts thereof, particularly carcasses of lamb, veal and calf.

This application is in part a continuation of our application entitled Method of freezing carcasses, Serial No. 157,052, filed August 2, 1937.

The present invention provides a method whereby the meat of a carcass of a lamb, veal or calf either in the form of a whole carcass or a wholesale portion thereof may be frozen, carried in freezer storage for an extended period of time and then defrosted without adversely affecting the condition or appearance of the meat.

By way of illustration but not by way of limitation the invention will be described as applied to a calf or veal carcass.

The drawing is a view of a veal carcass 1 which is suspended from a suspension means such as 2, covered with a cloth 3, which has been soaked in a salt water solution, and an outside paper bag 4, which is broken away to show the cloth. A satisfactory shroud as 3 may be prepared from a piece of beef sheeting 40 inches by 60 inches in size, with a split of 12 inches cut down from the center of one of the 40 inch ends. Before application to the calf carcass, the shroud is lightly moistened with a preservative, preferably a sodium chloride water solution from 5 degrees to 20 degrees salometer reading strength. The cloth is then tightly and smoothly applied on the skinned surfaces of the carcass and fastened by such means as pins, sewed string stitches, or string ties and self binding tucks. In the latter instance, the self-binding tucks occur at the gambrel cords.

Any desired means may be employed in applying the cloth to the carcass to assure a smooth, close fit. Immediately after clothing, a paper bag 4, preferably a crinkled paper bag such as a kraft bag, closed on all sides and at one end, is pulled over the carcass and fastened in place by string ties 5 at each of the knee joints of the hind legs, as shown in the drawing. A complete enclosure is effected by folding the top of the bag between the hind legs in confectioners' style.

After clothing and bagging, the carcass is placed in a freezer and preferably quick frozen.

We have found that the carcass may be held for extended periods and upon defrosting, indications of age or freezing are entirely absent.

We have found that it is essential in carrying out the present invention that the surface of the carcass be treated with a salt water solution and that the carcass either during or immediately following freezing be placed in a humidor package, a kraft paper bag being an effective humidor bag.

Alternative to the procedure which has been outlined, the carcass may be frozen by the direct application of low temperature brine. The frozen carcass may then be washed sufficiently to remove excess salt, placed in a humidor package and held in freezer storage. We prefer, however, to apply a cloth to the carcass to assure an adequate, uniform distribution of brine on the carcass surface, and in practice the cloth is more easily applied before freezing.

A satisfactory method of handling is to apply the dry cloth to the carcass, freeze by direct brine sprays, wash with clear water sprays and then apply a dilute brine spray to assure a proper concentration of brine. As has been pointed out, a 20 degrees salometer reading strength solution is found extremely effective. It will be understood, of course, that care must be exercised to avoid the application of too great a brine strength as concentrated brine would cure the meat and alter the fresh meat appearance.

One aspect of the present invention involves the defrosting of edible carcasses. By way of illustration, this aspect of the invention will be described as applied to sheep carcasses, or lambs as they are termed in the trade.

Some types of meat may be frozen in carcass form or in smaller portions with relative success, examples being quarters of beef carcasses and some cuts of pork. It has been the experience of the packing industry that lambs may not be successfully frozen and later defrosted since freezing and thawing by conventional methods greatly deteriorates the condition and appearance of lamb carcasses.

Due to the breeding habits of sheep, spring lamb is a seasonable product. It has long been realized that it would be desirable to have a method whereby excess lambs coming to market in seasons of high production might be preserved for consumption in seasons of low production. The present invention permits the freezing, storage and subsequent defrosting of lambs without adversely affecting the condition or appearance of the carcass; on the contrary, it enhances the condition and appearance.

In carrying out the invention with respect to a lamb carcass, the carcass is hot skinned, that is, the pelt is removed promptly after slaughter and before dissipation of the animal heat.

A cloth, preferably wrung out in a brine solution, is applied to the skinned surface of the carcass, the cloth being relatively permanently affixed as by stitches or the like. A second cloth or shroud is applied over the first but is preferably held in place by temporary means, such as pins. The carcass is then chilled for from twelve to twenty-four hours in coolers held at a temperature of from 33 to 35 degrees Fahrenheit. The carcass is then covered with a paper bag or other material which is substantially impervious to atmospheric moisture and transferred to a freezer where the carcass is frozen, preferably at a temperature of from 0 to —10 degrees Fahrenheit. The carcass is then stored in a high humidity freezer held at a temperature of from 0 to 10 degrees Fahrenheit at 100 per cent relative humidity, and held in freezer storage until it is desired to market the carcass.

Upon removal of the lamb from freezer storage, the paper bag or impervious outer wrapping is removed. A cloth, such as a sheep wipe, is placed in the carcass cavity and the carcass then defrosted. The preferred procedure is to place the carcass, after removal of the paper bag but before the removal of either of the two cloths or shrouds, in a thaw room at a temperature of about 42 to 43 degrees Fahrenheit for a period of twenty hours, the atmosphere being at about fifty per cent relative humidity. The carcass is then transferred to a conditioning room and held at a temperature of about 32 to 33 degrees Fahrenheit for a period of twenty-four hours at approximately fifty per cent relative humidity, and following conditioning the outer shroud is removed. The inner cloth will be found to be clean and relatively dry. The carcass is then in condition for re-bagging, that is, covering with a paper bag or other covering substantially impervious to atmospheric moisture and shipment to the trade.

We have found that this treatment permits the freezing and holding in freezer storage of lamb carcasses without deterioration in condition or appearance. Although the invention is also adaptable for other types of carcasses, it is peculiarly effective in the case of lamb since other methods of handling have not been found to be successful with sheep carcasses.

It will be noted that the present invention involves a freezing process and a defrosting process, and, in addition, the invention involves a complete process which permits the storage of carcass meat in freezer storage, which process includes steps preliminary to freezing, storage, and the steps of defrosting and steps subsequent thereto.

The preliminary treatment of the carcass by the use of a brine soaked cloth whitens and improves the appearance of the skinned surface. The protection of the carcass with the double shroud and outer bag during the freezing process prevents excessive dehydration during the freezing process. The retention of this protection during freezer storage prevents desiccation during freezer storage. When the carcass is removed from freezer storage and placed in the thaw room, the paper bag being removed, condensation forms frost or snow on the outer shroud which may be readily brushed off to prevent excessive moisture on the shrouds. The subsequent defrosting develops moisture in the cloths and the moisture in contact with the surface of the carcass passes through the first shroud and by capillary action is taken up by the second shroud from whence it is evaporated. Temperatures of 42 or 43 degrees Fahrenheit are effective for rapid defrosting. During this period the skinned surface is protected by the shrouds and the cavity by the sheep wipes.

It will be readily apparent that after the thawing step of about twenty hours at these temperatures, frost remains at the center of the thicker portions of the carcass, such as the hind legs adjacent the round bone. Continued holding at such temperatures would be detrimental to the remainder of the carcass.

The conditioning room permits the subsequent defrosting of the thicker portions of the carcass without adversely affecting the other portions of the carcass, and during the conditioning the outer shroud, which may be wet from moisture absorbed from the surface of the carcass wicked up through the inner shroud and moisture deposited by condensation, is given an opportunity to dry, after which, upon the removal of the outer shroud and the sheep wipes from the cavity, the carcass is in condition to be bagged and shipped.

By the term "a carcass of lamb, veal and calf," as used in the foregoing specification and in the appended claims, is meant animals so designated in the trade, or as otherwise specified, animals of that classification which have not reached maturity.

We claim:

1. The method of treating freshly skinned lamb carcasses which comprises applying two layers of brine moistened cloth over the skinned surface of a hot skinned lamb, enclosing the double clothed carcass in an outer wrapper substantially impervious to atmospheric moisture, freezing the carcass, holding in freezer storage, removing from freezer storage, removing the outer wrapper substantially impervious to atmospheric moisture, substantially defrosting by subjecting the carcass to temperatures substantially 10 degrees Fahrenheit above the freezing point of water, conditioning the carcass by holding at temperatures at or slightly above the freezing point of water for a sufficient length of time to permit moisture on the cloths to substantially evaporate and to completely defrost the carcass.

2. The method of treating freshly skinned lamb carcasses which comprises applying two layers of brine moistened cloth over the skinned surface of a hot skinned lamb, enclosing the double clothed carcass in an outer wrapper substantially impervious to atmospheric moisture, freezing the carcass, holding in freezer storage, removing from freezer storage, removing the outer wrapper substantially impervious to atmospheric moisture, substantially defrosting by subjecting the carcass to temperatures substantially 10 degrees Fahrenheit above the freezing point of water, conditioning the carcass by holding at temperatures at or slightly above the freezing point of water for a sufficient length of time to permit moisture on the cloths to substantially evaporate and to completely defrost the carcass and thereafter removing the outer cloth and covering the single clothed defrosted carcass with an outer wrapper substantially impervious to atmospheric moisture.

3. The method of treating freshly skinned lamb carcasses which comprises applying two layers of brine moistened cloth over the skinned surface of a hot skinned lamb, enclosing the double clothed carcass in an outer wrapper substantially impervious to atmospheric moisture, freezing the carcass, holding in high humidity freezer storage, removing from freezer storage, removing the outer wrapper substantially impervious to atmospheric moisture, substantially defrosting by subjecting the carcass to temperatures substantially 10 degrees Fahrenheit above the freezing point of water, conditioning the carcass by holding at temperatures at or slightly above the freezing point of water for a sufficient length of time to permit moisture on the cloths to substantially evaporate and to completely defrost the carcass.

4. The method of treating the meat of a freshly skinned whole carcass of lamb, veal and calf and wholesale cuts thereof which comprises covering the skinned meat surface with a brine moistened cloth, applying a second brine moistened cloth over the first mentioned cloth, enclosing the double clothed meat in an outer wrapper substantially impervious to atmospheric moisture, freezing the meat, holding the meat in freezer storage, and thereafter removing the outer wrapper, defrosting the meat and removing the outer cloth.

5. The method of treating the meat of a freshly skinned whole carcass of lamb, veal and calf and wholesale cuts thereof which comprises covering the skinned meat surface with a brine moistened cloth, applying a second brine moistened cloth over the first mentioned cloth, enclosing the double clothed meat in an outer wrapper substantially impervious to atmospheric moisture, and thereafter freezing the meat for an indefinite period.

6. The method of treating the meat of a freshly skinned whole carcass of lamb, veal and calf and wholesale cuts thereof which comprises covering the skinned meat surface with a brine moistened cloth, applying a second brine moistened cloth over the first mentioned cloth, enclosing the double clothed meat in a paper bag, freezing the meat, holding the meat in freezer storage for an indfinite period, and thereafter defrosting the meat.

7. The method of treating the meat of a freshly skinned whole carcass of lamb, veal and calf and wholesale cuts thereof which comprises covering the skinned meat surface with a brine moistened cloth, applying a second brine moistened cloth over the first mentioned cloth, enclosing the double clothed meat in a paper bag, freezing the meat, holding the meat in freezer storage for an indefinite period, and thereafter removing the paper bag, defrosting the meat and removing the outer cloth.

8. The method of treating the meat of a freshly skinned whole carcass of lamb, veal and calf and wholesale cuts thereof which comprises covering the skinned meat surface with a brine moistened cloth, applying a second brine moistened cloth over the first mentioned cloth, enclosing the double clothed meat in a paper bag, freezing the meat, holding the meat in freezer storage for an indefinite period, and thereafter removing the paper bag, defrosting the meat, removing the outer cloth and re-enclosing the defrosted meat in a paper bag.

BEVERLY E. WILLIAMS.
LEON L. CADWELL.